US008433789B2

(12) United States Patent
Nagatani

(10) Patent No.: US 8,433,789 B2
(45) Date of Patent: Apr. 30, 2013

(54) INFORMATION PROCESSING APPARATUS, INFORMATION PROCESSING METHOD, AND STORAGE MEDIUM

(75) Inventor: Masahiro Nagatani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 12/748,771

(22) Filed: Mar. 29, 2010

(65) Prior Publication Data

US 2010/0250738 A1    Sep. 30, 2010

(30) Foreign Application Priority Data

Mar. 31, 2009  (JP) ................................ 2009-086155

(51) Int. Cl.
   *G06F 15/173*   (2006.01)
(52) U.S. Cl.
   USPC ........... 709/224; 709/223; 709/227; 709/229; 358/1.15
(58) Field of Classification Search .................. 709/223, 709/224, 227, 229; 358/1.15
   See application file for complete search history.

(56) References Cited

U.S. PATENT DOCUMENTS

| 6,301,012 | B1 | 10/2001 | White |
| 2004/0085900 | A1 | 5/2004 | Nishio |
| 2006/0274363 | A1 | 12/2006 | Katano |
| 2007/0011354 | A1* | 1/2007 | Ohara .......................... 709/245 |
| 2009/0132731 | A1* | 5/2009 | Nakamura ...................... 710/19 |
| 2009/0144360 | A1* | 6/2009 | Wada ............................ 709/203 |
| 2009/0144401 | A1* | 6/2009 | Kawai .......................... 709/220 |

FOREIGN PATENT DOCUMENTS

| JP | 2000-033755 A | 2/2000 |
| JP | 2002-007091 A | 1/2002 |
| JP | 2004-048462 A | 2/2004 |
| JP | 2006-340286 A | 12/2006 |

OTHER PUBLICATIONS

U.S. Appl. No. 13/140,814, filed Jun. 17, 2011, Tatsuhiko Sakai.
U.S. Appl. No. 12/996,484, filed Dec. 6, 2010, Fumihide Goto.
U.S. Appl. No. 12/989,070, filed Oct. 21, 2010, Tatsuhiko Sakai.
U.S. Appl. No. 12/988,781, filed Oct. 20, 2010, Tatsuhiko Sakai.

* cited by examiner

*Primary Examiner* — Liangche A Wang
(74) *Attorney, Agent, or Firm* — Carter, DeLuca, Farrell & Schmidt LLP

(57) ABSTRACT

An apparatus configured to perform a search via communications excluding unicast and to use a registration function for searching for and registering a network device includes a re-search unit configured to re-search the registered network device when an actual operation is performed or when a status is acquired. The re-search unit performs the re-search via communication including unicast to re-search for the network device.

19 Claims, 14 Drawing Sheets

FIG.2A

AVAILABLE PRINTERS 201

( ADD THIS PRINTER )  PrinterA(00-00-11-AA-BB-CC)

( ADD THIS PRINTER )  PrinterB(00-00-11-AA-BB-DD)

( ADD THIS PRINTER )  PrinterC(00-00-22-AA-BB-CD)

FIG.2B

ADD NEW PRINTER

NAME: PrinterA(00-00-11-AA-BB-CC)

LOCATION: A-10F

DESCRIPTION: Color Printer ( CONTINUE )

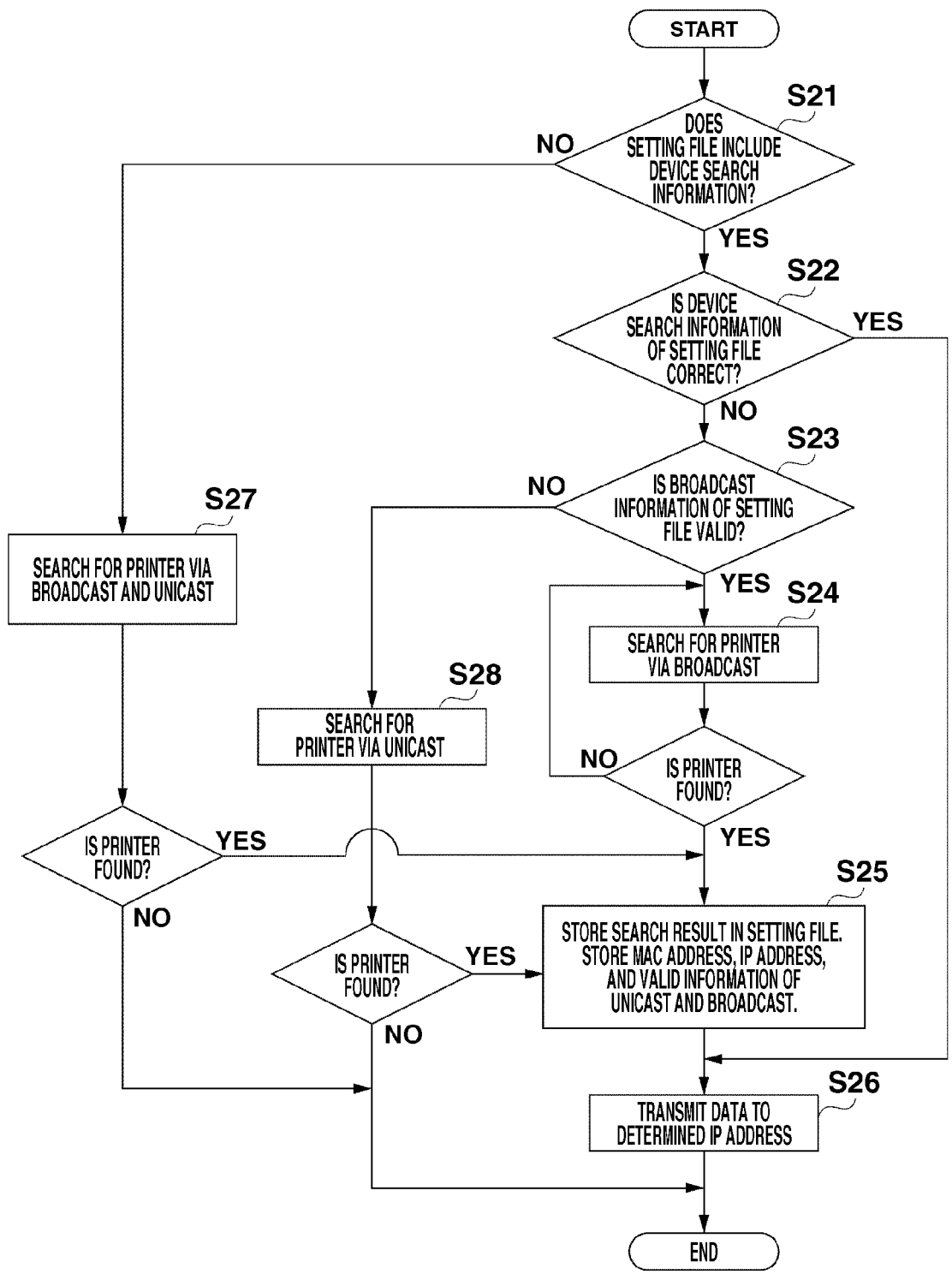

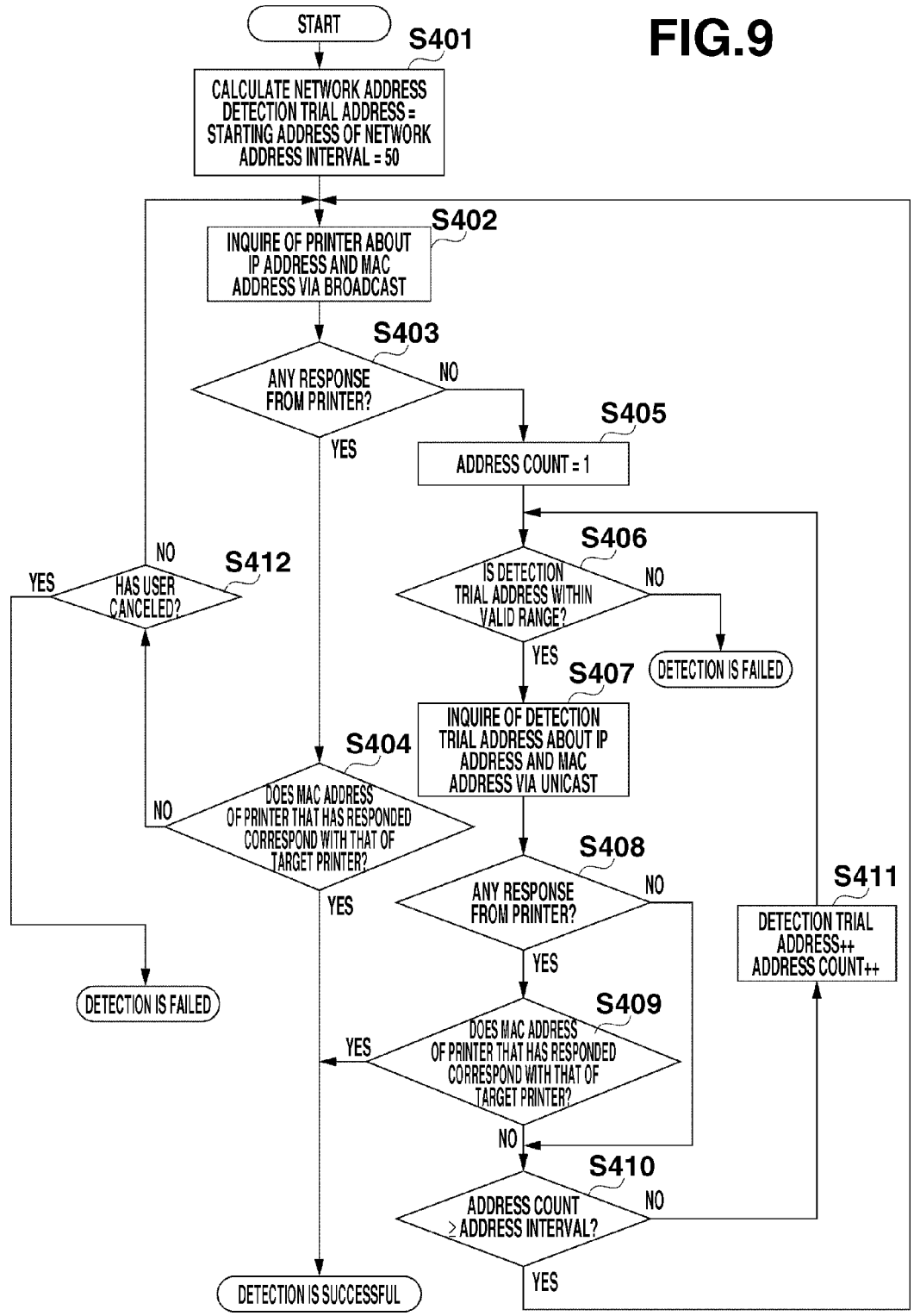

FIG.10A

```
#  rpm -ivh cnijfilter-common-v310.rpm
   ‿‿‿    ‿‿‿‿‿‿‿‿‿‿‿‿‿‿‿‿‿‿‿
   801           802
```

FIG.10B

| MAC ADDRESS | IP ADDRESS | BroadCast/UniCast VALID INFORMATION |
|---|---|---|
| 00-00-11-AA-BB-CC | 192.168.1.21 | BroadCast |
| 00-00-11-AA-BB-EE | 192.168.1.22 | BroadCast |

| MAC ADDRESS | IP ADDRESS | BroadCast/UniCast VALID INFORMATION |
|---|---|---|
| | | |

FIG.10D

```
# lpadmin -p PRINTER_A -m ABC.ppd -v net:/00-00-11-22-33-44- E
  ‿‿‿‿‿‿  ‿‿‿‿‿‿‿‿‿  ‿‿‿‿‿‿‿  ‿‿‿  ‿‿‿‿‿‿‿‿‿‿‿‿‿‿‿‿‿‿‿‿‿
   401       402        403   404            405
```

| MAC ADDRESS | IP ADDRESS | BroadCast/UniCast VALID INFORMATION |
|---|---|---|
| 00-00-11-AA-BB-CC | 192.168.1.21 | UniCast |
| 00-00-11-AA-BB-EE | 192.168.1.22 | UniCast |

FIG.14

```
# search_printers          1701
                                      1702
 ******  Searching printers. Please wait.  ******

Results:

Printer      : MAC Address         IP Address
   ----------------------------------------------------
                                                        1703
   1.PRINTER_A  : 00-00-11-22-33-AA   192.168.1.12
   2.PRINTER_B  : 00-00-11-22-33-BB   192.168.1.13
   3.PRINTER_C  : 00-00-11-22-33-CC   192.168.1.14

1704           1705                1706
```

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus that detects a network device, an information processing method, and a storage medium.

2. Description of the Related Art

Typically, a conventional local area network (LAN) at home is constituted by Ethernet or a wireless LAN and uses Transmission Control Protocol/Internet Protocol (TCP/IP). The TCP/IP allows each device to be specified and to communicate with each other by using an IP address. However, since a user is required to have knowledge about a network when allocating an address, the user having no specific knowledge thereabout generally has difficulties.

Thus, at general homes, a router connecting the LAN to the Internet is provided with a server function of Dynamic Host Configuration Protocol (DHCP). Typically, this function automatically allocates an IP address to a connected device. Since the DHCP server dynamically allocates IP addresses, the same address is not always allocated to the connected device every time the connected device is activated.

When an electronic device such as a printing apparatus is used from a computer that is a host device, the computer stores an IP address of an electronic device and transmits data to the IP address thereof to communicate with the electronic device. At this point, when an address different from the IP address stored in the computer is allocated to the electronic device, the computer has no address for communicating with the electronic device, thereby being unable to communicate therewith.

In order to solve this problem, when the computer cannot communicate with the electronic device by using the IP address of the electronic device stored by the computer, a method is used for detecting a desired device by using broadcast or multicast via which a packet is transmitted to an unspecified target. This method enables the computer to store a variable value, which is the IP address of the device, and a value unique to the device such as a media access control (MAC) address, and to inquire about the IP address via broadcast.

A device which has received the inquiry transmits a response including a unique value (MAC address) therein. A device which has received the response compares a unique value stored in the device with the unique value included in the response to check whether the device which has responded is a desired device. Further, if an IP address is included in the response, the IP address of the desired device can be also checked.

There are examples in which a peripheral device such as a printer connected to a network is automatically recognized in an environment where a DHCP server dynamically allocates an IP address, as described below. Japanese Patent Application Laid-Open No. 2000-033755 discusses an example in which printer information is obtained via Service Location Protocol (SLP).

Japanese Patent Application Laid-Open No. 2002-007091 discusses an example in which a printer and a server connected to a network serve as a DHCP server. Japanese Patent Application Laid-Open No. 2004-048462 discusses an example in which variations of combinations of an IP address and a MAC address are recognized.

In recent years, according to increasing security consciousness, software of a firewall has been widely used for computers at home. The firewall monitors a communication of computers via a network and restricts the communication to prevent an unauthorized access from an external device and a connection to an unauthorized host.

Since data is transmitted to an unspecified host when the broadcast or the multicast is used, the computer can be restricted from using the broadcast and the multicast by some settings of the software of the firewall. In other words, for example, a response transmitted by an application to a request via the broadcast may not be able to reach the application due to a block by the firewall.

In this situation, the electronic device to which an address different from that allocated earlier by the DHC server cannot be detected via the broadcast or the multicast.

Since there are various kinds of software of the firewalls that are, for example, standard-equipped with an operation system and made by a third party, it is generally impossible for other applications to know settings of the software. Thus, even if the firewall is not set for a use via the broadcast or the multicast, the application cannot know the setting.

In other words, when the application cannot receive the response to the request transmitted via the broadcast or the multicast, the application cannot determine a reason of not receiving the response. More specifically, it is impossible to determine that the application cannot receive the response due to the block by the firewall or disconnection of the network, for example, a power of a target device is not turned on.

Since Linux (registered trademark) has more usages as a server than those of Windows (registered trademark) or Macintosh (registered trademark), a security level is set higher when the firewall is set. Further, Linux has countless varieties of distributions. Since major version is upgraded about every half a year, a user may not be able to set some types of the firewall, and the settings are different depending on the distribution, the firewall cannot be easily set.

In some environments, since the broadcast or the multicast may be blocked by some settings of the firewall, a device search may not be able to be performed via the broadcast. Thus, performing printing or acquiring a status is failed since the user may not be able to install or register a printer, or, since the device search is performed when printing or acquiring the status by using an installation unit and a registration unit that do not perform the search.

On the other hand, there is a method for inquiring about each address of the network. Using this method is advantageous in that the device can be always searched for without being bothered by the setting of the firewall. However, since all of the IP addresses allocated over the network need to be individually communicated, for example if 0.2 seconds are necessary for one device, and if 254 devices are allocated over the network, 0.2 seconds×254 devices=50.8 seconds are necessary at a maximum. For the broadcast, although necessary time differs depending on the setting, several seconds may be enough for making an inquiry.

Linux adopts the Common Unix (registered trademark) Printing System (CUPS) as a printing system. The printer can be registered on a printer registration function screen (http://localhost:631) of the CUPS (CUPS WEB user interface (UI) as illustrated in FIG. 1).

At this point, when a "new printer search" button 101 is clicked, each back-end (module communicating with the printer) installed in the system is activated. The back-end is used for searching for a printer. The back-ends include a standard back-end previously installed in the system of the Linux and the back-end to be copied to a system when a printer driver prepared by each vendor is installed.

The standard back-end includes a universal serial bus (USB), a parallel back-end, a Line Printer daemon protocol (LPR) back-end, and a back-end for a network. The buck-end to be copied includes the USB back-end for "A" company, the parallel backend for "A" company, an LPR back-end for "B" company, and a back-end for a network for "C" company. Further, a considerable number of back-ends unique to a type of each device are included.

Thus, since all of the back-ends are activated to search for a printer, even if only one back-end takes time to search for a printer, the CUPS WEB UI illustrated in FIG. 1 keeps searching. The back-end that takes time, for example, specifies each of all IP addresses in the network to search for a printer via unicast.

Since a screen does not change during a printer search, the user cannot perform a next operation. When the printer search is completed, a screen illustrated in FIG. 2A is displayed. When the user wants to add a printer, the user clicks an "add this printer" button 201. A screen where a name, a location, and description of the printer can be input is displayed as illustrated in FIG. 2B.

More specifically, examples are described below in which the printer search performed using the CUPS WEB UI takes time.

Condition (0) When a back-end for searching for each IP address among all addresses of the network is provided.
Example (1) When a USB printer is to be registered.
Example (2) When a power of a target printer in the network is off.

At this point, a time until the printer search is completed is, for example, if 0.2 seconds are necessary for one device, and if 254 devices are allocated to the network, 0.2 seconds×254 devices=50.8 seconds at a maximum.

In other words, when the broadcast or the multicast is used, even if a printer is not searched for due to the firewall, a printer can be registered. Thus, printing or acquisition of the status may not be eventually performed. On the other hand, if each of all IP addresses in the network is communicated via the unicast, too much time is necessary for the search.

Japanese Patent Application Laid-Open No. 2006-340286 discusses printer search processing by using the broadcast or multicast and the unicast together. However, since the CUPS WEB UI may be used for registration in the Linux environment, only one search method may fail in a search depending on timing for searching a printer, thereby causing inefficiency.

SUMMARY OF THE INVENTION

According to an aspect of the present invention, an apparatus configured to perform a search via communication excluding unicast and to use a registration function for searching for and registering a network device includes a re-search unit configured to re-search the registered network device when an actual operation is performed or when a status is acquired. The re-search unit performs the re-search via communication including unicast to re-search for the network device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B illustrate a second printer registration screen and a third printer registration screen of the CUPS printing system for registering a printer according to an exemplary embodiment of the present invention.

FIG. 8 is a flowchart for performing printing and acquiring a printer status according to the first exemplary embodiment.

FIG. 9 is a flowchart for searching for a device according to the first exemplary embodiment.

FIGS. 10A, 10B, 10C, and 10D illustrate each screen according to the first exemplary embodiment.

FIG. 14 illustrates a screen on which the printer search command, a message displayed during the search, and printers successfully searched for are displayed in a list according to the second exemplary embodiment.

DESCRIPTION OF THE EMBODIMENTS

Various exemplary embodiments, features, and aspects of the invention will be described in detail below with reference to the drawings.

Figure 3:
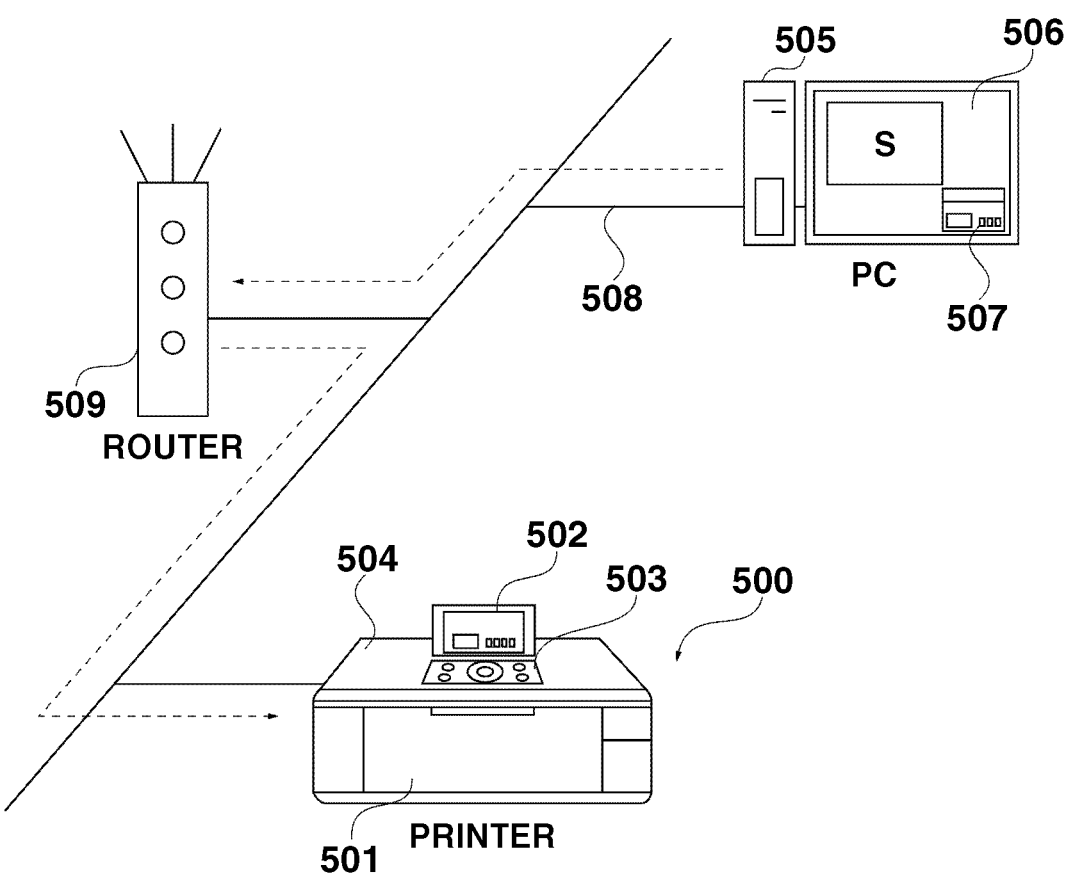
FIG. 3 is a schematic view of network printing according to an exemplary embodiment of the present invention.

FIG. 3 is a schematic view in which an information processing apparatus (personal computer (PC)) 505 according to a first exemplary embodiment of the present invention performs printing via a network. An input/output apparatus 500 is, for example, a multifunction peripheral (MFP). A printer unit 501 outputs color printing onto a printing sheet by using four color inks, which are yellow (Y), magenta (M), cyan (C), and black (B) inks.

A crystal liquid panel 502 is mounted to the MFP. The liquid crystal panel 502 displays in color a setting of the MFP including a setting of copy, conditions of a printer including network information (wired LAN/wireless LAN switching setting, IP address, and MAC address), an amount of remaining ink, an error of the apparatus, and a message during the printing.

Some connection formats of the MFP include a USB connection and a network connection. A network is connected by either one of a wired LAN and a wireless LAN. An input/output apparatus operation unit 503 includes a power key, a copy button, and a printing cancel key. A scanning unit 504 is served as a color image scanner of a flat-bed type mounted to an upper part of a printer unit.

The software, which is a printer driver, for printing is installed in the MFP of the PC 505. Printing data is generated by an application via the printer driver, and transmitted to the MFP to be printed. A monitor 506 displays a screen of the PC, and a user observes the screen to activate the application and perform printing.

During the printing, a printing status is displayed on a status monitor 507 of the printer driver. The MFP 500 can be connected to the PC 505 by a network cable 508 via a router 509, and also can be connected by wireless LAN.

Figure 4:
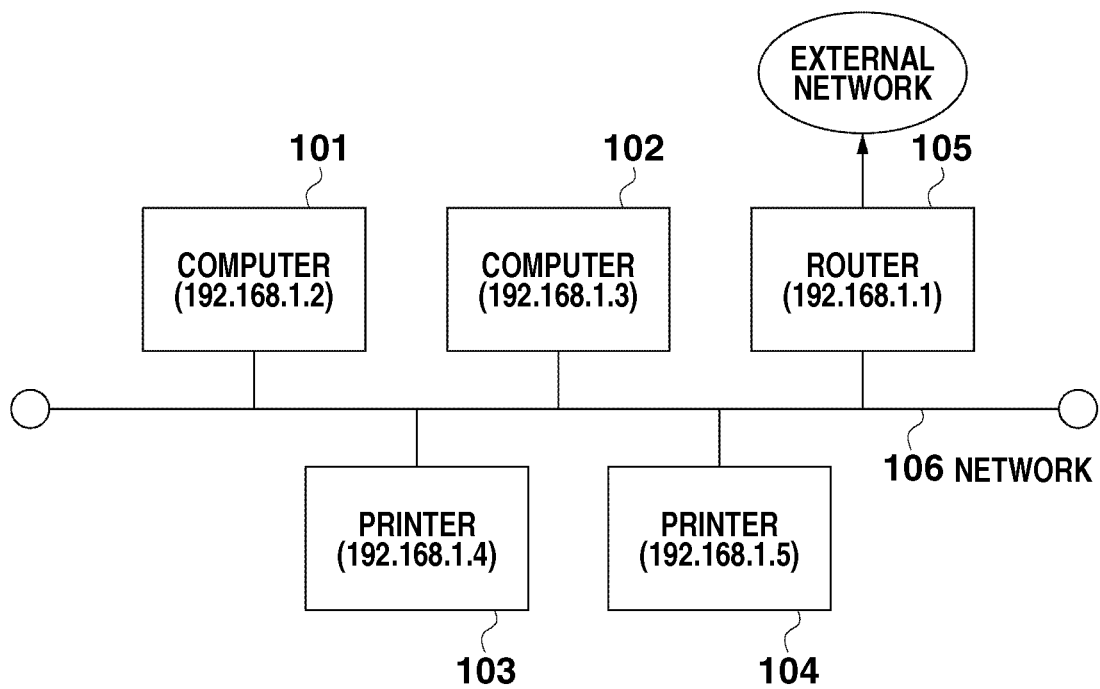
FIG. 4 illustrates an example of a configuration of a system according to a first exemplary embodiment of the present invention.

In FIG. 4, computers 101 and 102, printers 103 and 104, and a router 105 are connected to a network 106. Each network device communicates with each other according to TCP/IP protocol.

The router 105 has a DHCP server function, and allocates the IP addresses to computers 101 and 102, and the printers 103 and 104. An IP address of "192.168.1.1" is allocated to the router 105, "192.168.1.2", "192.168.1.3", "192.168.1.4", and "192.168.1.5" are allocated to the computers 101 and 102, and the printers 103 and 104, respectively, right after powers are turned on.

Figure 5:
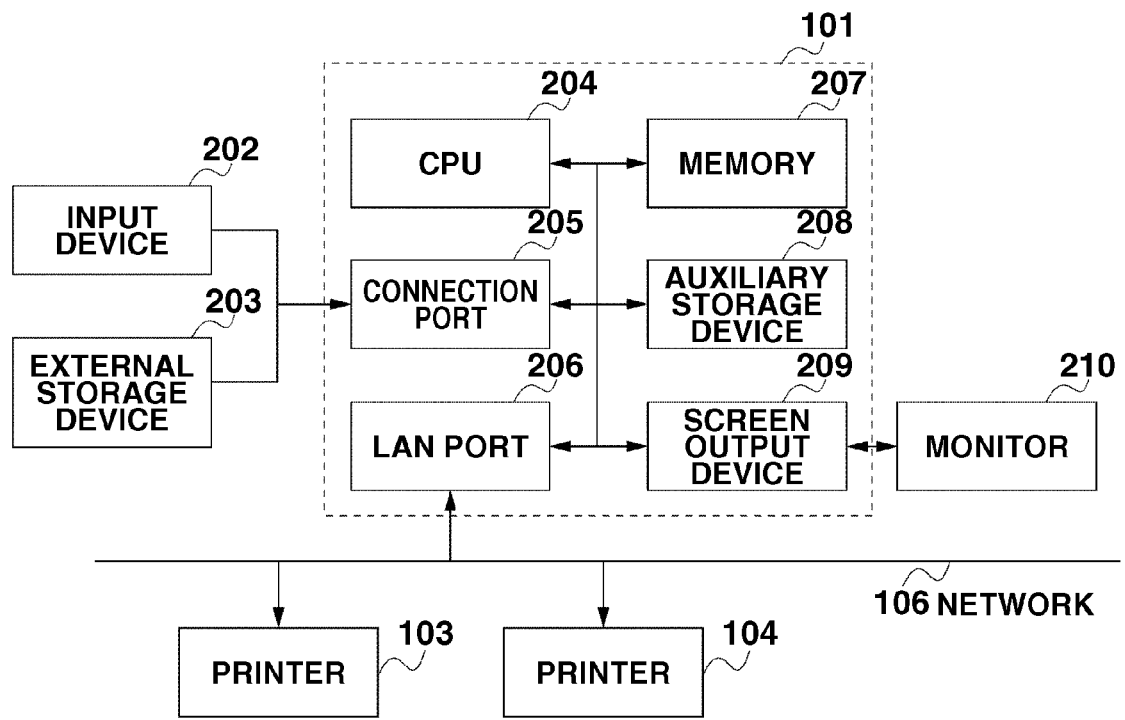
FIG. 5 illustrates an example of a configuration of hardware of each computer according to the first exemplary embodiment.

The computer 101 has such a configuration as illustrated in FIG. 5. The computer 101 includes a central processing unit (CPU) 204, a connection port 205 for connecting a peripheral device such as a serial port and a USB port, and a LAN port 206 for connecting to the network. Further, the computer 101 includes a memory 207, an auxiliary storage device 208 such as the hard disk and a solid state drive (SSD), and a screen output device 209 for outputting an image to a screen such as a video card.

A keyboard and a mouse, which are output ports, an input device 202 such as the scanner, a USB memory and an external hard disk, an external storage device 203 such as a compact disc read only memory (CD-ROM) and a digital versatile disc ROM (DVD-ROM) are each connected to the connection port 205 such as a Serial Advanced Technology Attachment (SATA) port and the USB port. The monitor 210 is connected to an output terminal of the screen output device 209.

The LAN port 206 is connected to the network 106. The printers 103 and 104 are connected to the same network 106 as that the computer 101 is connected to. The computer 102 has a similar configuration to that of the computer 101.

Figure 6:
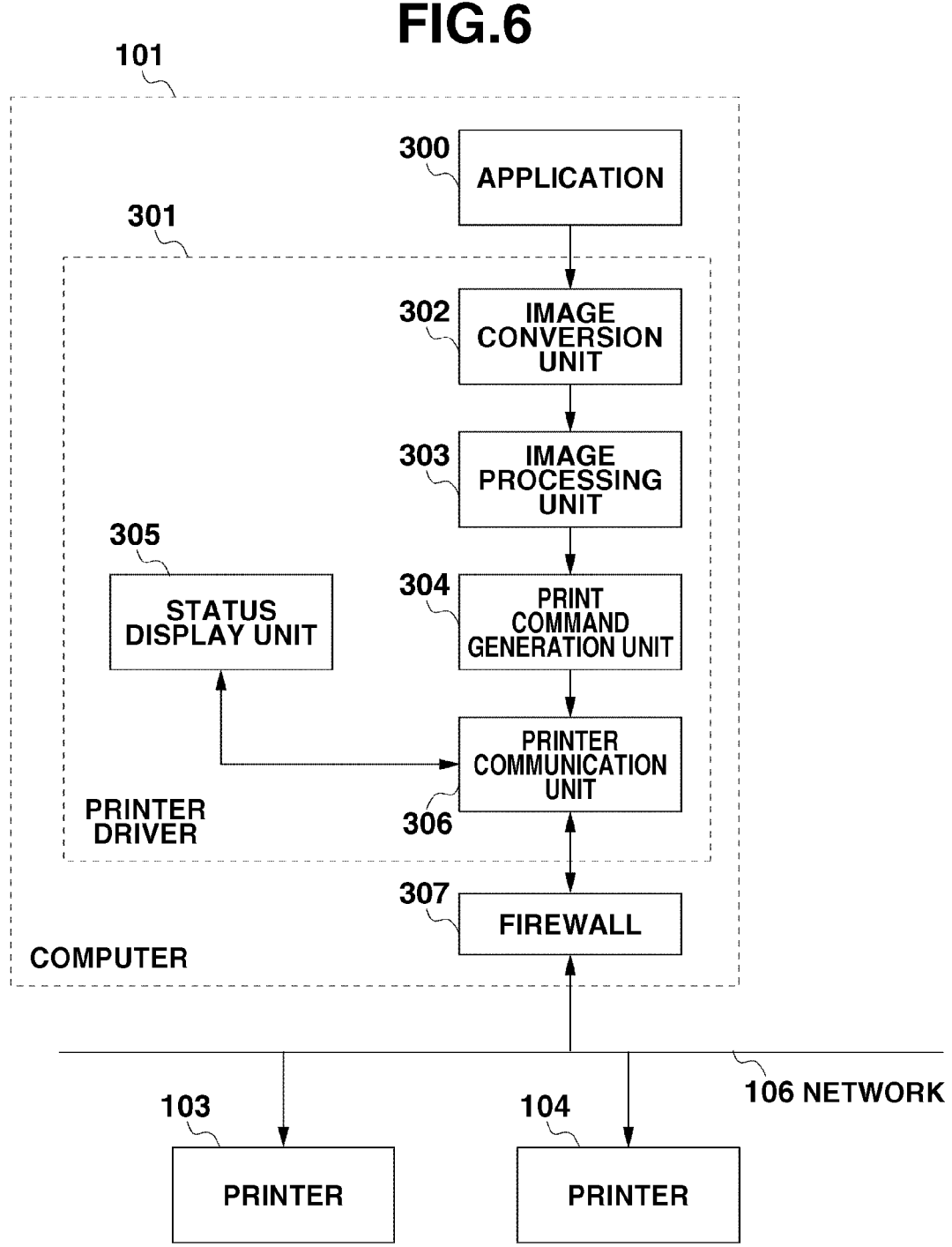
FIG. 6 illustrates an example of a configuration of software including a printer driver according to the first exemplary embodiment.

The computer 101 includes the software (printer driver in the present exemplary embodiment) for detecting the printer and performing printing. FIG. 6 illustrates a configuration of the software of the computer 101, which includes an application 300, a printer driver 301, and a firewall 307.

The printer driver 301 includes an image conversion unit 302 for converting red, green and blue (RGB) elements of an image data format into cyan, magenta, yellow, and black elements of an image data format that is suitable for printing, and an image processing unit 303 for performing image processing such as error diffusion according to a printing setting specified by the user to process the image data format into the format suitable for printing.

Further, the printer driver 301 includes a printing command generation unit 304 for generating a command which the printer can interpret, a printer communication unit 306 for detecting the printer and transmitting/receiving a printing command, and a status display unit 305 for notifying the user of the status of the printer. Furthermore, the printers 103 and 104 are connected to the same network 106 as that the computer 101 is connected to. The computer 102 has a similar configuration of the printer driver to that of the computer 101.

In the computer 101, the firewall 307 is set to allow the printer driver 301 to communicate via the broadcast. In the computer 102, setting of the firewall 307 is not specifically changed, and thus the printer driver 301 cannot appropriately communicate via the broadcast.

Each of the computers 101 and 102 previously retains an ID unique to the printer 103 (MAC address in the present exemplary embodiment), for example, since the user inputs the ID when the user installs the printer 103.

Figure 7:
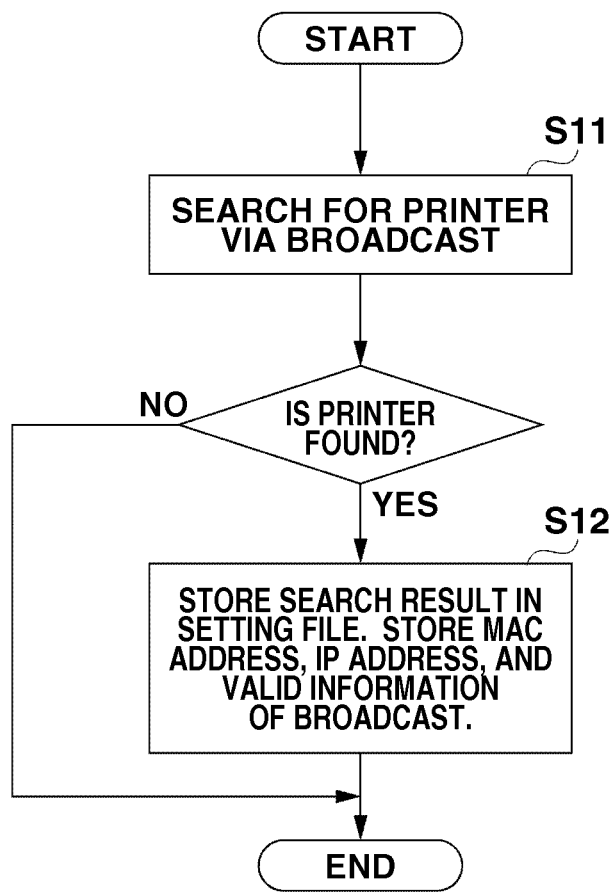
FIG. 7 is a flowchart for registering a CUPS printer according to the first exemplary embodiment.

With reference to FIGS. 7 and 8, a processing flow of the present exemplary embodiment will be described. The programs according to the flows illustrated in FIGS. 7 and 8 are stored in the auxiliary storage device 208. The programs are loaded by the memory 207 and executed by the CPU 204. The printer driver is installed using a command line as illustrated in FIG. 10A.

A package install red hat package manager (RPM) command 801 is prepared by a distribution. A printer driver 802 is to be installed. When a graphic user interface (GUI) is double-clicked, the printer driver 802 can be installed. The printer is subsequently registered.

Figure 1:
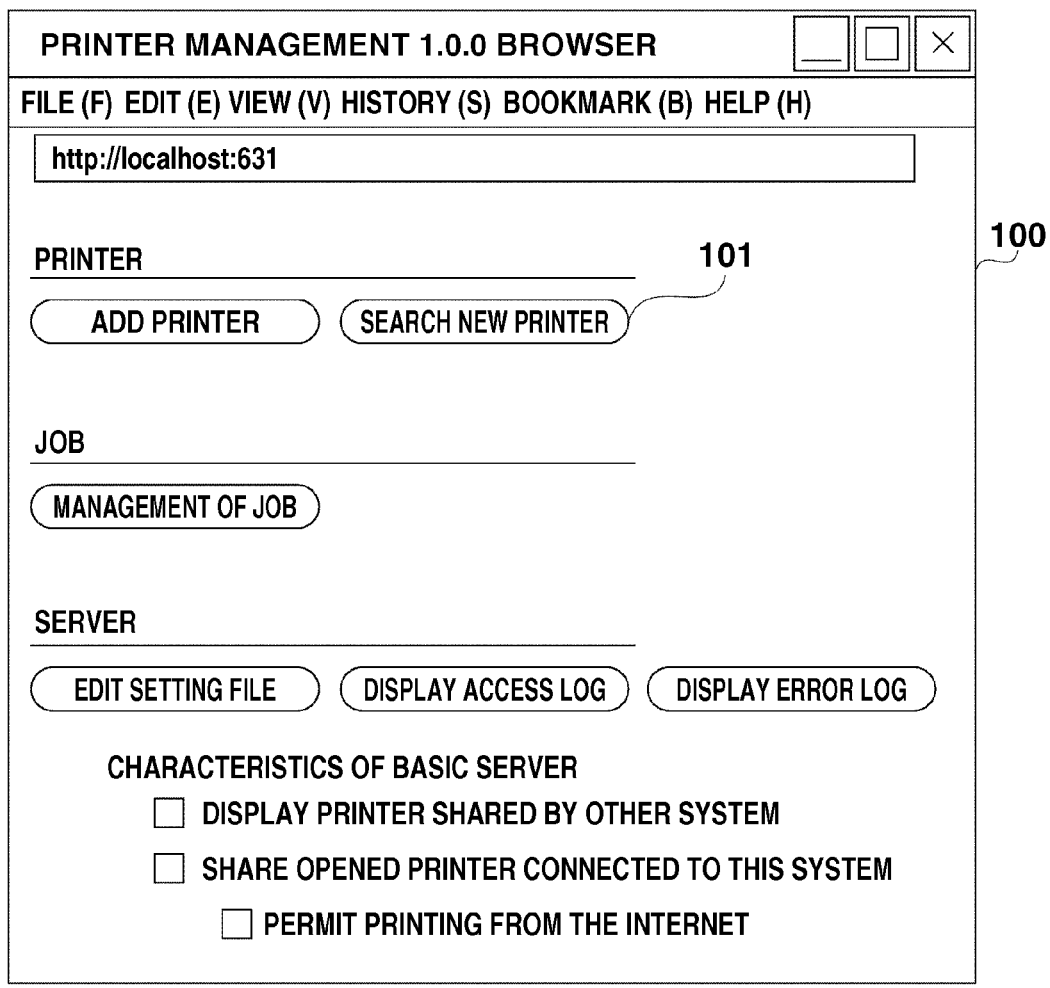
FIG. 1 illustrates a first printer registration screen of a CUPS printing system for registering a printer according to an exemplary embodiment of the present invention.

For example, the CUPS printing system, which is mounted in the system of the computer, can perform management of the printer in a browser by using a registration function 100 as illustrated in FIG. 1. More specifically, when a "new printer search button" 101 as illustrated in FIG. 1 is clicked with the printer connected to the network, the printer is registered.

At this point, in step S11 in FIG. 7, the printers are searched for using broadcast addresses (255.255.255.255) in the network via the broadcast all at once, and the MAC address and the IP address are inquired.

This search via the broadcast is completed in several seconds. At this point, if the printer is found, then in step S12, a result for searching the printer is stored in a setting file as device-search information according to a format illustrated in FIG. 10B. When a plurality of printers can be successfully searched, the device-search information for a number of searched printers is stored.

A MAC address (information unique to the device) 901 in the format illustrated in FIG. 10B is described as, for example, "00-00-AA-BB-CC-DD". An IP address 902 (when DHCP is used, the IP address can be varied according to a connection timing) allocated to the MAC address by the DHCP function is described as, for example, "192.168.1.21".

Further, since the printer is successfully searched via the broadcast, "BroadCast" is described for BroadCast/UniCast valid information 903. Although the printer search is performed, when no printer is found, the device-search information is not added as illustrated in FIG. 10C.

If the printer is found and the user clicks an "add this printer" button 201 of the printer to be used as illustrated in FIG. 2A, a diagram illustrated in FIG. 2B is displayed. The user inputs a name, a location, and description to continue and complete registration of the printer by using the CUPS WEB UI.

When the user clicks the button 101 illustrated in FIG. 1, some settings of the firewall of the system can block the broadcast. If the printer search cannot be performed due to the block, the registration can be continued by registering the printer by using a command line.

The command line registration is performed as illustrated in FIG. 10D. At this point, the printer is registered only and is not searched for in the network by the command line registration. Thus, the device-search information is not added to the setting file. A command 401 is used to register the printer. The user can freely name a registration name 402 of a printer.

A postscript printer description (PPD) file 403 includes information about a type of a device which describes a media name and size thereof. A back-end 404 can be specified according to a connection topology (network connection or USB connection) to the printer. Information 405 of "00-00-11-22-33-44" specifies a device, and, when the network is used, specifies a MAC address. The registration of the printer by using the command line is completed.

Now that the registration of the printer has been completed, processing for printing will be described with reference to a flow illustrated in FIG. 8. FIG. 8 illustrates a flow when printing is actually performed. The flow is executed when the status is acquired.

The following printing procedures are performed under conditions described below.

Condition 1-1 When a printer is registered using a command line.
Condition 1-2 When a printer can be searched for via the broadcast.
Condition 1-3 When a setting file does not include device-search information.

When printing is performed, then in step S21 in FIG. 8, a setting file generated in a registration operation is checked. When the setting file does not include the device-search information as illustrated in FIG. 10C, the processing proceeds to step S27 to start to search for a printer. In step S27, there is a possibility to successfully search for a printer via the broadcast. Thus, both of the broadcast and the unicast are used for searching for a printer. For example, to search for a printer more efficiently, a method simply by using the following procedures are considered.

When the broadcast takes 7 seconds and the unicast takes 0.2 seconds for one address, Broadcast (7 seconds)->Unicast (254 devices: 192.168.1.1 to 192.168.1.254) (0.2 seconds×254 IP addresses).

In step S27, firstly, a printer is searched for via the broadcast. When a printer is found, it is checked whether a MAC address of the printer corresponds to a MAC address when the printer has been registered. If the MAC addresses correspond to each other, search processing is completed. If the MAC addresses do not correspond to each other, then in step S25, the acquired device-search information (IP address, MAC address, and broadcast valid information) is stored in the setting file, and, then in step S26, printing data is transmitted to the determined IP address.

If the MAC addresses do not correspond to each other, the printer search is performed over all IP addresses via the unicast. More specifically, when 254 valid IP addresses of "192.168.1.1" to "192.168.1.254" are included in the network to which the printer is connected, the IP addresses from "192.168.1.1" to "192.168.1.254" are individually inquired.

If a MAC address of an IP address which has responded does not correspond to a MAC address of a printer when the printer has been registered (when a printer is not found), the search processing is ended. If the MAC addresses correspond to each other, (when a printer is found), then in step S25, the acquired device-search information (IP address, MAC address, and unicast valid information) is stored, and then in step S26, printing data is transmitted to the determined IP address.

Figure 11A:
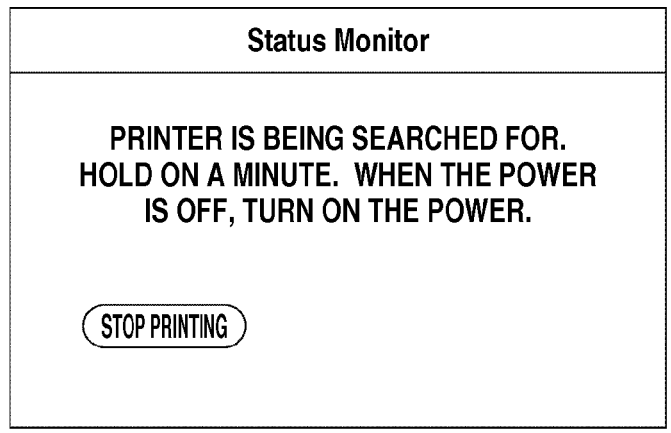
FIGS. 11A, 11B, and 11C illustrate each status monitor screen according to the first exemplary embodiment.

While a printer is being searched for via the unicast, a message "PRINTER IS BEING SEARCHED FOR. HOLD ON A MINUTE. WHEN THE POWER IS OFF, TURN ON THE POWER" is displayed or notified as illustrated in FIG. 11A. When a printer is not found, since a power is likely to be off, the search is performed via the broadcast again. When a printer is not still found, subsequently, IP addresses from "192.168.1.1" to "192.168.1.254" are individually inquired via the unicast.

The processing described above (the search is performed via the broadcast again, and IP addresses from "192.168.1.1" to "192.168.1.254" are individually inquired via the unicast) may be repeatedly performed. Alternatively, a time-out may be provided to stop the search. Further, the search may be ended at a time when the user cancels printing. Although an address via the unicast starts with "192.168.1.1", an address may start with an IP address of a PC, and the search may be performed in a direction in which IP addresses are decreased.

For example, under the following conditions, a printer can be found in a time acquired by a calculation described below.
Condition A-1 When an IP address of a target printer is "192.168.1.222".
Condition A-2 When a printer search can be performed via the broadcast.
Condition A-3 When a user turns on a power of a printer ten seconds after starting to print.
Broadcast (7 seconds)+Unicast (0.2 seconds×222 IP addresses)=51.4 seconds As described below, by repeating the search via the unicast having a shifted range from that of the broadcast, a printer can be found more quickly when the printer search can be performed via the broadcast and when a power is turned on.

Broadcast (7 seconds)->Unicast (50 IP addresses: 192.168.1.1 to 192.168.1.50) (0.2 seconds×50)->Broadcast (7 seconds)->Unicast (50 IP addresses: 192.168.1.51 to 192.168.1.100) (0.2 seconds×50)->

Broadcast (7 seconds)->Unicast (50 IP addresses: 192.168.101 to 192.168.1.150) (0.2 seconds×50)->Broadcast (7 seconds)->Unicast (50 IP addresses: 192.168.1.151 to 192.168.1.200) (0.2 seconds×50)->

Broadcast (7 seconds)->Unicast (50 IP addresses: 192.168.1.201 to 192.168.1.250) (0.2 seconds×50)->Broadcast (7 seconds)->Unicast (4 IP addresses: 192.168.1.251 to 192.168.1.254) (0.2 seconds×4)->

For example, under the following conditions, a printer can be found in a time acquired by a calculation described below.
Condition A-1 When an IP address of a target printer is "192.168.1.222".
Condition A-2 When a printer can be searched for via the broadcast.
Condition A-3 When a user turns on a power of a printer ten seconds after starting to print.
Broadcast (7 seconds)->Unicast (50 IP addresses: 192.168.1.1 to 192.168.1.50)+Broadcast (7 seconds)=24 seconds Although an address via the unicast starts with "192.168.1.1", an address may start with the IP address of the PC, and the search may be performed in a direction in which IP addresses are decreased.

With reference to FIG. 9, an example described above will be described in detail. A program of a flow illustrated in FIG. 9 is stored in the auxiliary storage device 208. The program is loaded by the memory 207 and executed by the CPU 204. The CPU 204 acquires network information of the computer 101.

In step S401, the CPU 204 calculates a network address and initialize a detection trial address and an address interval. The detection trial address refers to a target address to be used when a trial detection is performed via the unicast. The address interval refers to a variation for determining a timing for performing the detection via the broadcast and defines how many addresses need to be checked before the detection is performed via the broadcast.

In the present exemplary embodiment, as the network information, the network address of "192.168.1.0" and a sub net mask of "255.255.255.0" are acquired. Since a range of the network is located in a range where bits of the sub net mask do not exist, the range of the network is located in a range between "192.168.1.0" and "192.168.1.255".

The first address of "192.168.1.0" is the network address, and the last address of "192.168.1.255" is a broadcast address. The first and last addresses have specific meanings. Therefore, an address actually allocated for the device is within a range between "192.168.1.1" and "192.168.1.254". The detection trial address is set to "192.168.1.1". According to the present exemplary embodiment, a constant value (=50) is set for the address interval. This figure is just an example, and may be varied according to a number of the addresses over the network.

In step S402, the CPU 204 transmits a command, which is a request command, for inquiring about a MAC address and an IP address which are prepared as printer commands to a broadcast addresses to inquire about the MAC address and the IP address. The broadcast address may be "192.168.1.255" or "255.255.255".

When a printer connected to the network 106 responds, then in step S403, the CPU 204 checks only the response in this step. In the computer, as described above, the firewall 307 is set such that the printer driver 301 can communicate with the printer via the broadcast. However, the printer driver 301 cannot know the settings of the firewall 307.

Thus, the printer driver 301 determines whether the printer driver 301 can communicate with the printer via the broadcast by receiving a response from the printer connected to the network 310 by using the broadcast address. Since no printer is turned on from the beginning, no printer actually responds, and the processing proceeds to step S405.

For example, if a power of the printer 104 is on, the printer 104 responds and the printer driver 301 can receive the response, and the processing proceeds to step S404. The printer 104 is not the target printer 103. However, the printer driver 301 can at least determine that communication via the broadcast is valid by the response from the printer 104.

At this point, the CPU 204 does not perform the detection via the unicast. The processing returns to step S402, and the CPU 204 performs the detection via the broadcast again. When the processing returns to step S402, then in step S412, the CPU 204 determines whether the user cancels printing. If the user cancels printing, the detection is failed and the processing is ended. In addition to the cancel by the user, the processing may be ended by the time-out too.

According to the present exemplary embodiment, since no powers of the printers 103 and 104 are turned on, it is determined that the detection via the broadcast is failed. As a cause of this case, it can be considered that the powers of the printers 103 and 104 are not turned on, the printers 103 and 104 are not correctly connected to the network 106, or a communication via the broadcast is blocked by the firewall 307. The printer driver 301 cannot determine the cause. The processing proceeds to step S405, and the detection by the search via the unicast is performed.

In step S405, an address count for counting the number of detection addresses via the unicast is initialized to "1".

In step S406, the CPU 204 checks whether a detection trial address is within a valid range. Since the address count is initialized, the detection trial address of "192.168.1.1" is within the valid range between "192.168.1.1" and "192.168.1.254".

In step S407, the CPU 204 inquires of the detection trial address, which is a unicast address, about the IP address and the MAC address by using the request command. In other words, the CPU 204 makes an inquiry to "192.168.1.1".

Subsequently, in step S408, the CPU 204 checks whether there is a response to the request command. However, since "192.168.1.1" is an address of the router 105, there is no response to the request command. The processing proceeds to step S410.

In step S410, a determination is made to once perform the detection via the broadcast at a stage where fifty addresses have been checked by checking the number of addresses via the unicast. The address count remains "0", and the processing proceeds to step S411.

In step S411, the detection trial address is advanced by "1", and the address count is advanced by "1". Accordingly, the detection trial address becomes "192.168.1.2", and the address count becomes "1".

Since the power of the printer 103 is not turned on, steps S406, S407, S408, S409, S410, and S411 are repeatedly performed. The detection trial address advances to "192.168.1.50" with no response received. During the processing described above, the printer 103 is turned on.

In step S410, the address count becomes equal to the address interval (=50), and the processing proceeds to step S402. With this determination, the detection via the unicast and the detection via the broadcast are repeatedly performed.

In step S403, the CPU 204 inquires of the broadcast addresses about the MAC address and the IP address by transmitting the request command again. Since the power of the printer 103 is turned on, the printer 103 responds to the inquiry. The processing proceeds to step S404.

Subsequently, in step S404, the CPU 204 checks whether the printer that has responded is the target printer 103. The CPU 204 checks whether the MAC address included in data responded corresponds to the MAC address retained by the computer 101. In the present exemplary embodiment, the target printer 103 responds to the inquiry, and the MAC address of the printer 103 corresponds to the MAC address retained by the computer 101. Thus, the detection is successful.

When the printer 103 is detected, the IP address "192.168.1.4" of the printer 103 is acquired by checking the IP address included in response data. The acquired IP address is used for performing subsequent communications. A printer communication unit transmits printing data to the printer 103, and the printer 103 receives the printing data and starts printing based on the printing data.

The following printing procedures are performed under conditions described below.

Condition 2-1 When a printer is registered using the CUPS WEB UI.
Condition 2-2 When a printer can be searched for via the broadcast.
Condition 2-3 When device-search information included in a setting file indicates that the broadcast is valid.

When printing is performed, in step S21, it is checked whether the setting file includes the device-search information. In step S22, it is checked whether the device-search information included in the setting file is correct. More specifically, the CPU 204 inquires of the IP address 902 (FIG. 10B) corresponding to the MAC address of the registered printer about the MAC address. The CPU 204 checks whether the responded MAC address corresponds to the MAC address 901 included in the setting file.

When the device-search information is correct, the processing proceeds to step S26 and the printing data is transmitted to the IP address so that printing is performed. When the responded MAC address does not correspond to the MAC address 901 included in the setting file, or when the power of the printer is turned off, the processing proceeds to step S23.

Referring to broadcast/unicast valid information corresponding to the inquired IP address in the setting file, the broad cast is indicated to be valid. Thus, in step S24, the printer search is performed only via the broadcast and continued until a printer is successfully searched for.

Figure 11B:
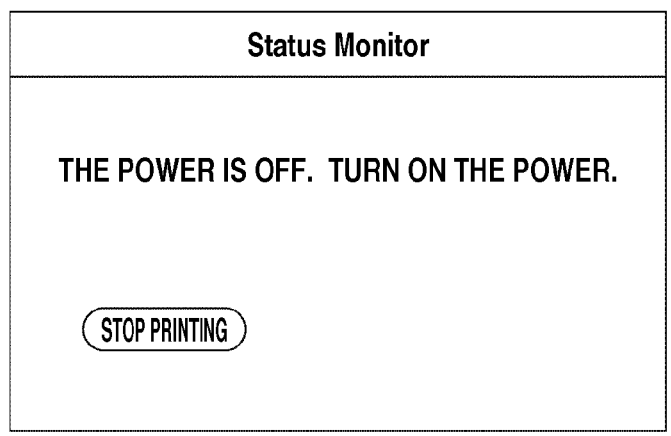

At this point, since the MAC address whose broadcast is set to be valid according to the device-search information and which has been detected earlier is not found on a status monitor, it can be determined that the power of the printer is off. Thus, a message of "THE POWER IS OFF. TURN ON THE POWER." or "CABLE IS NOT CONNECTED. CHECK CONNECTION." is displayed as illustrated in FIG. 11B so that the user can promptly turn the power on.

When the user turns on the power, the search is instantly ended. In step S25, the printer driver writes the device-search information including the MAC address, the IP address, and the broadcast valid information. If the IP address has been updated by the DHCP function of the router, an item for the IP address is changed. If not updated, the item is not changed. In step S26, the print data is transmitted to the determined IP address to perform the printing.

In an exemplary embodiment where the broadcast valid information (multicast valid information) is not used, step S23 is not performed. In this case, when "NO" is selected in step S22, the processing proceeds to step S24 to search for a printer via the broadcast. When a printer is found, the processing proceeds to step S25. If not, the processing proceeds to step S28 to search for a printer via the unicast.

The following printing procedures are performed under conditions described below.

Condition 3-1 When a printer is registered using a command line.
Condition 3-2 When a printer cannot be searched for via the broadcast.
Condition 3-3 When printing is once performed and the unicast valid information is stored in a setting file.

Since information is already included in the setting file in step S21, then in step S22, the CPU 204 checks contents of the setting file. The DHCP function of the router allocates the IP address. However, since the IP address is not changed in most cases, when the CPU 204 inquires of the IP address 902 (FIG. 10B) corresponding to the MAC address of the registered printer about the MAC address, the MAC address corresponding to the IP address corresponds to the responded MAC address. Thus, the processing proceeds to step S26.

The printing data is transmitted to the determined IP address, and the processing is ended. When a printer has not been used for a while in an environment of, for example, an office where plenty of PCs are connected, the DHCP function of the router may allocate a new IP address to the printer.

Thus, when the MAC address is not responded in step S22, or the responded MAC address does not correspond to that of the target printer, the processing proceeds to step S23 so as to check the broadcast/unicast valid information. Since the unicast is set to be valid here, even if the processing proceeds to step S28 to perform the search via the broadcast, the search is to be failed. Thus, only the search via the unicast is performed for searching for a printer. (If the search via the broadcast is performed, it takes more time.)

Figure 11C:
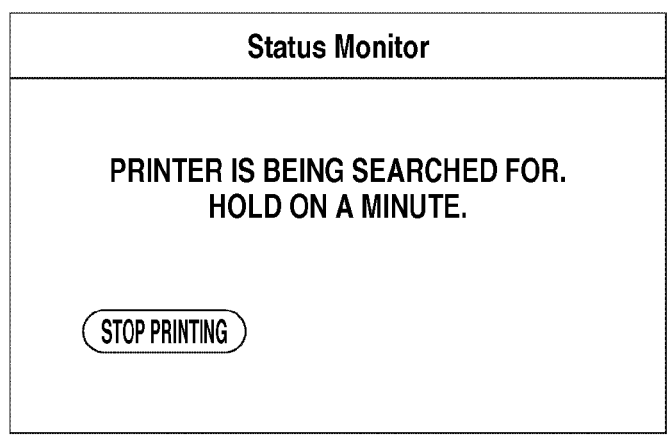

At this point, since a printer is being searched, the status monitor displays "PRINTER IS BEING SEARCHED FOR. HOLD ON A MINUTE" as illustrated in FIG. 11C. However, since a power of a printer can be off, "PRINTER IS BEING SEARCHED FOR. HOLD ON A MINUTE. WHEN THE POWER IS OFF, TURN ON THE POWER" may be displayed as illustrated in FIG. 11B. At a point when all the IP addresses are completed to be checked via the unicast, a power of a printer is confirmed to be off. Thus, a message of "THE POWER IS OFF. TURN ON THE POWER. SEARCHING FOR PRINTER TAKES TIME FOR A WHILE" may be displayed as illustrated in FIG. 12A.

Figures 12A, 12B:
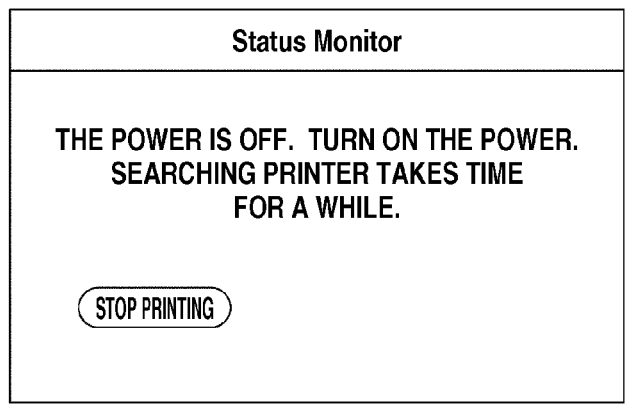
FIGS. 12A and 12B illustrate each screen according to the first exemplary embodiment.

When a printer is found as a result, then in step S25, the MAC address, the IP address, and the unicast valid information are written in the setting file as illustrated in FIG. 12B. In step S26, the printing data is transmitted to the determined IP address.

With this processing, even under various conditions, the printer search can be securely and efficiently performed based on whether the information is included in the setting file, and the broadcast and unicast valid information included therein. A message by which the user can easily take action can be displayed on the status monitor.

According to the present exemplary embodiment, a printer is searched for via the broadcast. However, a printer may be searched for via the multicast as a communication method in which a target is not specified.

Further, according to the present exemplary embodiment, an example for detecting a printer is described. However the present invention can be also applied to any device connected to the network.

Figure 13:
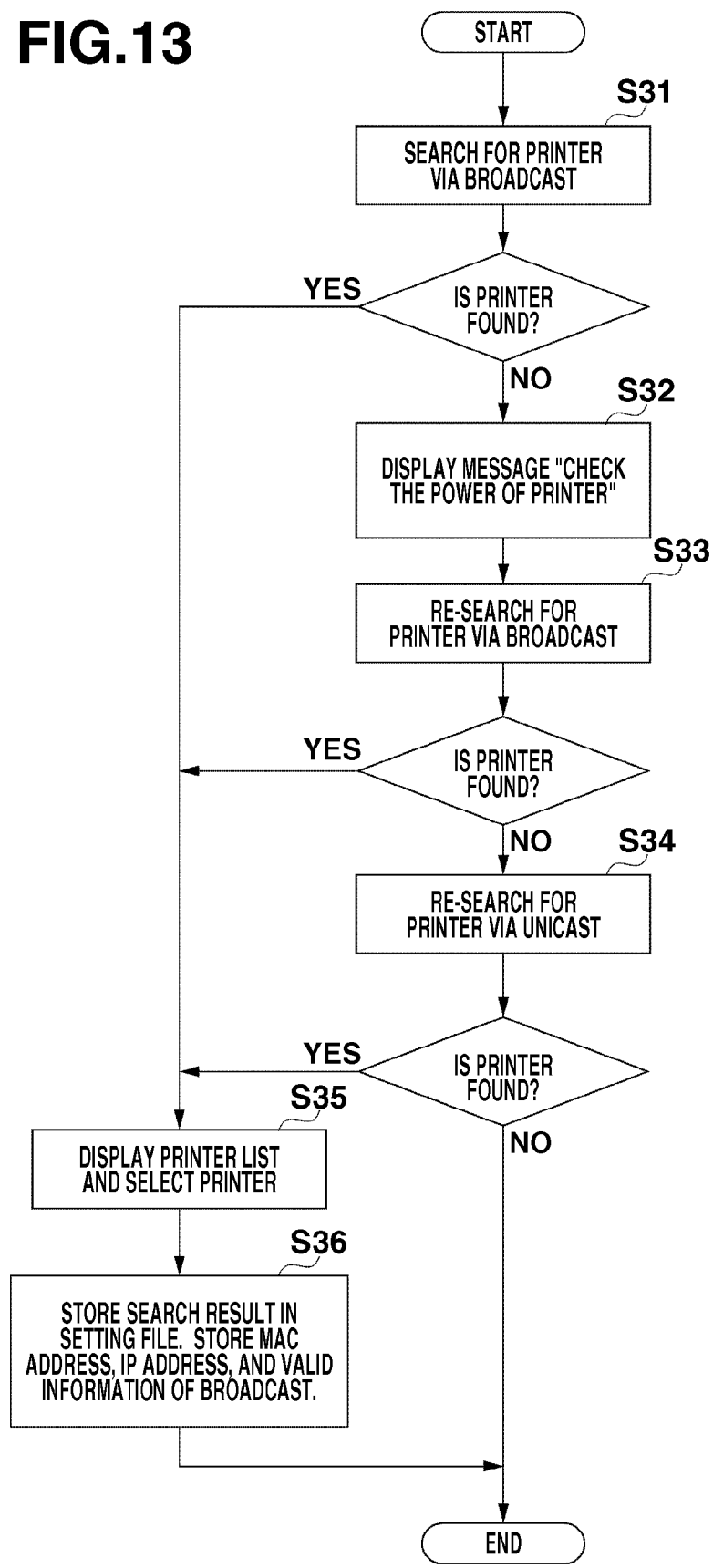
FIG. 13 is a flowchart for searching for a printer by using a printer search command according to a second exemplary embodiment of the present invention.

In a second exemplary embodiment of the present invention, with reference to FIG. 13, an exemplary embodiment for performing the printer search when a printer is registered using a command line is described. The printer search is performed using the command line according to the following procedures. A program of a flow illustrated in FIG. 13 is stored in the auxiliary storage device 208. The program is loaded by the memory 207 and executed by the CPU 204.

A printer search command 1701 illustrated in FIG. 14, which is prepared by a vendor, is executed from a terminal. In step S31 in FIG. 13, the printer search is performed via the broadcast. When a printer is found, the processing proceeds to step S35 and printers which are successfully searched for are displayed in a list 1703 as illustrated in FIG. 14 to allow the user to select a printer to be used.

If the user can determine by a name of type 1704 as illustrated in FIG. 14, the user can instantly select the printer. If the user cannot determine by the name of type, for example, when a plurality of same types of printers are found, the user may select the printer by checking a MAC address 1705 and an IP address 1706 on a liquid crystal panel of the printer.

When a printer is not found in step S31, the processing proceeds to step S32. A message of "CHECK THE POWER OF PRINTER" or "CABLE IS NOT CONNECTED. CHECK CONNECTION" is displayed on a terminal (not illustrated). The user turns on the power of a printer, and the CPU 204 continues processing according to an instruction by the user. In step S33, the CPU 204 performs the search via the broadcast again.

When a printer is found, the processing proceeds to steps S35 and S36. When a printer is not still found, the CPU 204 determines that a printer cannot be found via the broadcast, and the processing proceeds to step S34. The printer search is performed over all the IP addresses via the unicast and a message "PRINTER IS BEING SEARCHED FOR. HOLD ON A MINUTE." 1702 is displayed as illustrated in FIG. 14. When a printer is found in step S34, the processing proceeds to steps S35 and S36 to perform and end procedures. Since the processing for performing printing is similar to that in the first exemplary embodiment, description of the processing is not repeated in the present exemplary embodiment.

The vendor prepares the printer search command so that a connection format of the network and the vendor can be specified. Unlike the registration of a printer by using the CUPS WEB UI, conditions for taking time to register a printer by using the command are limited. More specifically, the registration of a printer by using the printer search command does not affect a connection via the USB and the search of a driver of another maker. Even if it takes some time to register a printer, a message can be displayed for informing the user that it takes some time to search a printer.

The present invention can be achieved by supplying to the system or the apparatus a storage medium in which a program code of the software that realizes the function of the present exemplary embodiment described above is stored. Further, the present invention can be also achieved by the computer, the CPU, or the microprocessor unit (MPU) of the system or the apparatus that loads and executes the program code stored in the storage medium. In this case, the program code itself loaded from the storage medium realizes the function of the exemplary embodiment described above, and thus the storage medium that stores the program code is included in the present invention.

The storage medium for supplying the program code includes, for example, a floppy disk, a hard disk, an optical disk, an optical magnetic disk, a CD-ROM, a compact disc recordable (CD-R), a magnetic tape, a non-volatile memory card, a ROM, and a digital versatile disc (DVD).

An operating system (OS) running in the computer performs a part or all of the actual processing of the functions of the exemplary embodiments described above. The present invention also includes a case in which the processing realizes the functions of the exemplary embodiments described above.

The CPU included in a function extension board or a function extension unit inserted into the computer performs a part or all of the actual processing of program code. The present invention further includes a case in which the processing realizes the functions of the exemplary embodiments described above.

According to the exemplary embodiment of the present invention, when the printer is registered using the CUPS WEB UI, since searching processing is performed only via the broadcast, even when a printer is not found, the searching processing is ended in several seconds. Thus, the connection via the USB and installation of other printers are smoothly operated without being bothered.

Furthermore, when printing is performed or the status is acquired, a network printer can be always found without being affected by an environment of the PC. Thus, printing can be performed and the status can be acquired without fail.

Information indicating whether the setting file is present and the broadcast/unicast valid information included in the setting file are retained. Therefore, the CPU can dynamically and unwastedly perform the search processing based on the information for searching for a printer next time. During the search, the message can be switched so that the user can easily take action using the status monitor.

According to the exemplary embodiment of the present invention, even the broadcast and the multicast cannot be used, a device can be detected. Further, the search processing can be completed at high speed, for example, even when the CUPS system is registering a printer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-086155 filed Mar. 31, 2009, which is hereby incorporated by reference herein in its entirety.

What is claimed is:

1. An apparatus that uses a registration function for registering information on a network device in a file, the apparatus comprising:
a computer that implements a search unit configured to search for the network device when printing is performed or when a status is acquired,
wherein the search unit performs the search via communication including unicast in a case where the information on the network device is registered in the file,
wherein the search unit performs the search via a broadcast in a case where the information on the network device is not registered in the file, and
wherein the search unit performs the search via the unicast in a case where the network device is not found via the broadcast.

2. The apparatus according to claim 1, wherein the registration function stores a search result including an address in the file when the network device is found by the search,
wherein the search unit searches for the network device when information in the file is not correct, and stores a search result including the address in the file when the network device is found by the search, and
wherein the apparatus further comprises a transmission unit configured to transmit data to the address when the information in the file is correct.

3. The apparatus according to claim 1, wherein the registration function stores a search result including an address in the file when the network device is found by the search,
wherein the search unit searches for the network device when information is not included in the file, and stores a search result including the address when the network device is found by the search, and
wherein the apparatus further comprises a transmission unit configured to transmit data to the address when information included in the file is correct.

4. The apparatus according to claim 1, wherein the registration function stores a search result including an address in the file when the network device is found by the search,
wherein the search unit searches for the network device via broadcast or multicast when information included in the file is not correct, searches for the network device via unicast when the network device is not found, and stores a search result including the address when the network device is found by the search, and
wherein the apparatus further comprises a transmission unit configured to transmit data to the address when information included in the file is correct.

5. The apparatus according to claim 1, wherein the registration function stores broadcast valid information or multicast valid information in the file when the network device is found via broadcast or multicast, and
wherein the search unit searches for the network device via broadcast or multicast when the broadcast valid information or the multicast valid information is stored in the file, searches for the network device via unicast when the broadcast valid information or the multicast valid information is not stored in the file, and stores a search result including an address in the file when the network device is found by the search.

6. The apparatus according to claim 5, wherein the search unit searches for the network device via broadcast or multicast and prompts a user to turn on the power of the network device when the broadcast valid information or the multicast valid information is stored in the file, and searches for the network device via unicast and informs a user that the network device is being searched for when the broadcast valid information or the multicast information is not stored in the file.

7. A method for performing a search using a registration function for registering information on a network device in a file, the method comprising:
   searching for the network device when printing is performed or when a status is acquired,
   wherein the searching performs the search via communication including unicast in a case where the information on the network device is registered in the file,
   wherein the searching performs the search via a broadcast and the unicast in a case where the information on the network device is not registered in the file, and
   wherein the searching performs the search via the unicast in a case where the network device is not found via the broadcast.

8. The method according to claim 7, wherein the registration function stores a search result including an address in the file when the network device is found by the search,
   wherein the searching searches for the network device when information in the file is not correct, and stores a search result including the address when the network device is found by the search, and
   wherein the method further comprises transmitting data to the address when the information included in the file is correct.

9. The method according to claim 7, wherein the registration function stores a search result including an address in the file when the network device is found by the search,
   wherein the searching searches for the network device when information is not included in the file, and stores a search result including the address when the network device is found by the search, and
   wherein the method further comprises transmitting data to the address when information included in the file is correct.

10. The method according to claim 7, wherein the registration function stores a search result including an address in the file when the network device is found by the search,
    wherein the searching searches for the network device via broadcast or multicast when information included in the file is not correct, searches for the network device via unicast when the network device is not found, and stores a search result including the address when the network device is found by the search, and
    wherein the method further comprises transmitting data to the address when information included in the file is correct.

11. The method according to claim 7, wherein the registration function stores broadcast valid information or multicast valid information in the file when the network device is found via broadcast or multicast, and
    wherein the searching searches for the network device via broadcast or multicast when the broadcast valid information or the multicast valid information is stored in the file, searches for the network device via unicast when the broadcast valid information or the multicast valid information is not stored in the file, and stores a search result including the address when the network device is found by the search.

12. The method according to claim 11, wherein the searching searches for the network device via broadcast or multicast and prompts a user to turn on the power of the network device when the broadcast valid information or the multicast valid information is stored in the file, and searches for the network device via unicast and informs a user that the network device is being searched for when the broadcast valid information or the multicast information is not stored in the file.

13. A non-transitory storage medium storing a program which, when executed by a computer, causes the computer to perform a method for performing a search using a registration function for registering information on a network device, the method comprising:
    searching for the network device when printing is performed or when a status is acquired,
    wherein the searching performs the search via communication including unicast in a case where the information on the network device is registered in the file,
    wherein the searching performs the search via a broadcast in a case where the information on the network device is not registered in the file, and
    wherein the searching performs the search via the unicast in a case where the network device is not found via the broadcast.

14. The storage medium according to claim 13, wherein the registration function stores a search result including an address in the file when the network device is found by the search,
    wherein the searching searches for the network device via communication including unicast when information in the file is not correct, and stores a search result including the address when the network device is found by the search, and
    wherein the method further comprises transmitting data to the address when the information included in the file is correct.

15. The storage medium according to claim 13, wherein the registration function stores a search result including an address in the file when the network device is found by the search,
    wherein the searching searches for the network device via communication including unicast when information is not included in the file, and stores a search result including the address when the network device is found by the search, and
    wherein the method further comprises transmitting data to the address when information included in the file is correct.

16. The storage medium according to claim 13, wherein the registration function stores a search result including an address in the file when the network device is found by the search,
    wherein the searching searches for the network device via broadcast or multicast when information included in the file and is not correct, searches for the network device via unicast when the network device is not found, and stores a search result including the address when the network device is found by the search, and
    wherein the method further comprises transmitting data to the address when information included in the file is correct.

17. The storage medium according to claim 13, wherein the registration function stores broadcast valid information or multicast valid information in the file when the network device is found via broadcast or multicast, and
    wherein the searching searches for the network device via broadcast or multicast when the broadcast valid information or the multicast valid information is stored in the file, searches for the network device via unicast when the broadcast valid information or the multicast valid information is not stored in the file, and stores a search result including the address when the network device is found by the search.

18. The storage medium according to claim 17, wherein the searching searches for the network device via broadcast or multicast and prompts a user to turn on the power of the network device when the broadcast valid information or the multicast valid information is stored in the file, and searches for the network device via unicast and informs a user that the network device is being searched for when the broadcast valid information or the multicast information is not stored in the file.

19. A non-transitory storage medium storing a program which, when executed by a computer using a registration function for registering information on a network device in a file, causes the computer to perform a method upon printing or acquiring a status, the method comprising:
- checking the network device based on the information registered in the file, in a case where the information on the network device is registered in the file;
- searching for the network device via a broadcast in a case where the information on the network device is not registered in the file; and
- searching for the network device via a unicast in a case where the network device is not found via the broadcast.

\* \* \* \* \*